United States Patent
Huang

(10) Patent No.: US 8,285,774 B2
(45) Date of Patent: Oct. 9, 2012

(54) OPERATION METHOD AND APPARATUS FOR PERFORMING OVERLAP FILTER AND CORE TRANSFORM

(75) Inventor: Chao-Tsung Huang, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 1111 days.

(21) Appl. No.: 12/177,168

(22) Filed: Jul. 22, 2008

(65) Prior Publication Data
US 2009/0240754 A1  Sep. 24, 2009

(30) Foreign Application Priority Data

Mar. 24, 2008 (TW) .............................. 97110416 A

(51) Int. Cl.
*G06F 17/14* (2006.01)
(52) U.S. Cl. ....................................................... 708/402
(58) Field of Classification Search .................. None
See application file for complete search history.

(56) References Cited

U.S. PATENT DOCUMENTS

| 5,859,788 | A  | * | 1/1999 | Hou ............................... 708/400 |
| 6,073,153 | A  | * | 6/2000 | Malvar ........................... 708/400 |
| 6,181,831 | B1 | * | 1/2001 | Sadjadian ....................... 382/276 |
| 6,324,560 | B1 | * | 11/2001 | Malvar ........................... 708/400 |
| 6,487,574 | B1 | * | 11/2002 | Malvar ........................... 708/400 |
| 7,292,730 | B1 | * | 11/2007 | Lippincott ..................... 382/233 |
| 8,036,274 | B2 | * | 10/2011 | Srinivasan et al. ........ 375/240.18 |
| 2004/0102963 | A1 |   | 5/2004 | Li |
| 2004/0162866 | A1 | * | 8/2004 | Malvar .......................... 708/404 |
| 2006/0129622 | A1 | * | 6/2006 | Dang ............................. 708/406 |
| 2006/0133682 | A1 |   | 6/2006 | Tu et al. |
| 2006/0133683 | A1 |   | 6/2006 | Srinivasan |
| 2006/0133684 | A1 |   | 6/2006 | Srinivasan et al. |
| 2007/0036225 | A1 |   | 2/2007 | Srinivasan et al. |
| 2007/0036335 | A1 |   | 2/2007 | Skradde et al. |
| 2007/0233764 | A1 | * | 10/2007 | Reznik et al. ................. 708/402 |

FOREIGN PATENT DOCUMENTS

| JP | 2006157925 | 6/2006 |
| JP | 2006174487 | 6/2006 |
| TW | I290438 | 11/2007 |

OTHER PUBLICATIONS

"Office Action of Taiwan Counterpart Application", issued on Sep. 21, 2011, p. 1-p. 4, in which the listed references were cited.
"Office Action of Japan Counterpart Application", issued on Nov. 9, 2010, p. 1-p. 6, in which the listed references were cited.

* cited by examiner

*Primary Examiner* — David H Malzahn
(74) *Attorney, Agent, or Firm* — Jianq Chyun IP Office

(57) ABSTRACT

A hardware implementation method for concurrently realizing overlap filter and core transform and an operation method thereof are provided. The overlap filter and core transform can be adjusted according to different specifications, processes, and operation frequencies. The hardware implementation method and the operation method thereof adopt a transform-level hardware sharing architecture and multi-port input/output register array, thereby efficiently realizing overlap filter and core transform.

19 Claims, 16 Drawing Sheets

| 4x4 PCT | 4x4 PCT | 4x4 PCT | 4x4 PCT |
|---------|---------|---------|---------|
| 4x4 PCT | 4x4 PCT | 4x4 PCT | 4x4 PCT |
| 4x4 PCT | 4x4 PCT | 4x4 PCT | 4x4 PCT |
| 4x4 PCT | 4x4 PCT | 4x4 PCT | 4x4 PCT |

4x4 PCT

Overlap filter operation

| a | b | c | d |
| e | f | g | h |
| i | j | k | l |
| m | n | o | p |

4x4PreFilter (int &a ... int &p)
{   T_h_pre(a, d, m, p, 0);
    T_h_pre(b, c, n, o, 0);
    T_h_pre(e, h, i, l, 0);
    T_h_pre(f, g, j, k, 0);

Ovp_Scale(a, p);
    Ovp_Scale(b, o);
    Ovp_Scale(e, l);
    Ovp_Scale(f, k);

Ovp_Rotate(n, m);
    Ovp_Rotate(j, i);
    Ovp_Rotate(h, d);
    Ovp_Rotate(g, c);

T_odd2_pre(k, l, o, p);
    T_h(a, d, m, p, 0);
    T_h(b, c, n, o, 0);
    T_h(e, h, i, l, 0);
    T_h(f, g, j, k, 0);
}

FIG. 8

4x4_PCT (int &a ... int &p)
{   T_h(a, d, m, p, 0);
    T_h(b, c, n, o, 0);
    T_h(e, h, i, l, 0);
    T_h(f, g, j, k, 0);

T_h(a, b, e, f, 1);
    T_odd(c, d, g, h);
    T_odd(i, m, j, n);
    T_odd2(k, l, o, p);
}

FIG. 9

```
T_h (int &a, int &b, int &c, int &d, int R)
{
    a += d;
    b -= c;
    int t1 = (a - b + R) >> 1;
    int t2 = c;
    c = t1 - d;
    d = t1 - t2;
    a -= d;
    b += c;
}
```

FIG. 10

| Cycle | Multi-port input | Operation units performing operation and inputs thereof | Register array | Multi-port output |
|---|---|---|---|---|
| 0 | Input a, d, m, p, b, c, n, o | T_h1 performs T_h_pre (a, d, m, p, 0)<br>T_h2 performs T_h_pre (b, c, n, o, 0) | Temporarily store results of T_h1 in registers 0, 3, 12, and 15<br>Temporarily store results of T_h2 in registers 1, 2, 13, and 14 | None |
| 1 | Input e, h, i, l, f, g, j, k | T_h1 performs T_h_pre (e, h, i, l, 0)<br>T_h2 performs T_h_pre(f, g, j, k, 0) | Temporarily store results of T_h1 in registers 5, 6, 9, and 10<br>Temporarily store results of T_h2 in registers 4, 7, 8, and 11 | None |
| 2 | None | Ovp_scale performs Ovp_Scale (R[0], R[15])<br>Ovp_4x1_pipe performs Ovp_Rotate (R[13], R[12] ) | Temporarily store results of Ovp_scale in registers 0 and 15<br>Temporarily store results of Ovp_4x1_pipe in registers 13 and 12 | None |
| 3 | None | Ovp_scale performs Ovp_Scale(R[5] , R[10])<br>Ovp_4x1_pipe performs Ovp_Rotate (R[9], R[8]) | Temporarily store results of Ovp_scale in registers 5 and 10<br>Temporarily store results of Ovp_4x1_pipe in registers 9 and 8 | None |
| 4 | None | Ovp_scale performs Ovp_Scale(R[1] , R[14])<br>Ovp_4x1_pipe performs Ovp_Rotate (R[7], R[3]) | Temporarily store results of Ovp_scale in registers 1 and 14<br>Temporarily store results of Ovp_4x1_pipe in registers 7 and 3 | None |

FIG. 11A

| Cycle | Multi-port input | Operation units performing operation and inputs thereof | Register array | Multi-port output |
|---|---|---|---|---|
| 5 | None | Ovp_scale performs Ovp_Scale (R[4], R[11])<br>Ovp_4x1_pipe performs Ovp_Rotate (R[6], R[2]) | Temporarily store results of Ovp_scale in registers 4 and 11<br>Temporarily store results of Ovp_4x1_pipe in registers 6 and 2 | None |
| 6 | None | T_odd2_pipe performs the first cycle of operation on T_odd2(R[10], R[11], R[14], R[15]) | Temporarily store results of T_odd2_pipe in registers 10, 11, 14 and 15 | None |
| 7 | None | T_odd2_pipe performs the second cycle of operation on T_odd2(R[10], R[11], R[14], R[15]) | Temporarily store results of T_odd2_pipe in registers 10, 11, 14, and 15 | None |
| 8 | None | T_h1 performs T_h (R[0], R[3], R[12], R[15], 0)<br>T_h2 performs (R[1], R[2], R[13], R[14], 0) | Temporarily store results of T_h1 in registers 0, 3, 12, and 15<br>Temporarily store results of T_h2 in registers 1, 12, 13, and 14 | None |

FIG. 11B

| Cycle | Multi-port input | Operation units performing operation and inputs thereof | Register array | Multi-port output |
|---|---|---|---|---|
| 9 | None | T_h1 performs T_h (R[5], R[6], R[9], R[10], 0) <br> T_h2 performs T_h (R[4], R[7], R[8], R[11], 0) | Temporarily store results of T_h1 in registers 5, 6, 9, and 10 <br> Temporarily store results of T_h2 in registers 4, 7, 8, and 11 | None |
| 10 | Input eight signals of sections B and C necessary for the 4x4 PCT in FIG. 6 | None | Temporarily store the four signals of the section B in registers 2, 3, 6, and 7 <br> Temporarily store the four signals of the section C in registers 8, 9, 12, and 13 | Output R[2], R[3], R[6], and R[7] to the outside where a section E in FIG. 6 is temporarily stored, Output R[8], R[9], R[12], and R[13] to the outside where a section F in FIG. 6 is temporarily stored |
| 11 | Input four signals of sections A necessary for the 4x4 PCT in FIG. 8 | None | Temporarily store the four signals of the section A in registers 0, 1, 4, and 5 <br> Temporarily store R[0], R[1], R[4], and R[5] in registers 10, 11, 14, and 15 | Output R[10], R[11], R[14], and R[15] to the outside where a section G in FIG. 6 is temporarily stored |
| 12 | None | T_h1 performs T_h (R[0], R[3], R[12], R[15], 0) <br> T_h2 performs (R[1], R[2], R[13], R[14], 0) | Temporarily store results of T_h1 in registers 0, 3, 12, and 15 <br> Temporarily store results of T_h2 in registers 1, 2, 13, and 14 | None |

FIG. 11C

| Cycle | Multi-port input | Operation units performing operation and inputs thereof | Register array | Multi-port output |
|---|---|---|---|---|
| 13 | None | T_h1 performs T_h (R[5], R[6], R[9], R[10], 0)<br>T_h2 performs T_h (R[4], R[7], R[8], R[11], 0) | Temporarily store results of T_h1 in registers 5, 6, 9, and 10<br>Temporarily store results of T_h2 in registers 4, 7, 8, and 11 | None |
| 14 | None | T_h1 performs T_h (R[0], R[1], R[4], R[5], 1)<br>T_odd performs (R[2], R[3], R[6], R[7]) | None | Output the results of T_h1 and T_odd (PCT operation results) to a subsequent process unit |
| 15 | None | T_odd2_pipe performs the first cycle of operation on T_odd2 (R[10], R[11], R[14], R[15]) | Temporarily store results of T_odd2_pipe in registers 10, 11, 14, and 15 | None |
| 16 | None | T_odd2_pipe performs the second cycle of operation on T_odd2(R[10], R[11], R[14], R[15])<br>T_odd performs T_odd(R[8], R[12], R[9], R[13]) | None | Outputs results of T_odd2_pipe and T_odd (PCT operation results) to the subsequent process unit |

FIG. 11D

OPERATION METHOD AND APPARATUS FOR PERFORMING OVERLAP FILTER AND CORE TRANSFORM

CROSS-REFERENCE TO RELATED APPLICATION

This application claims the priority benefit of Taiwan application serial No. 97110416, filed Mar. 24, 2008. The entirety of the above-mentioned patent application is hereby incorporated by reference herein and made a part of this specification.

BACKGROUND OF THE INVENTION

1. Field of the Invention

The present invention generally relates to a data processing apparatus and an operation method thereof, in particular, to an apparatus for concurrently realizing overlap filter and core transform and an operation method thereof.

2. Description of Related Art

Still image compression usually involves three main steps, namely, transform, quantization, and entropy coding. Referring to FIG. 1, the conventional JPEG standard employs Discrete Cosine Transform (DCT) in an individual transform unit of 8×8 block. Although the DCT transform with a favourable energy compression characteristic may obtain compression of approximate optimal data, a block effect cannot be prevented from occurring after a boundary tiled into blocks has been transformed.

Directed to this, Microsoft introduces a new still image compression format, i.e., an HD Photo format. At present, the format has been considered as a new JPEG international standard with a current name JPEG-XR. The HD Photo format employs lapped transform (LT) in a unit of 4×4 block, in order to reduce the block effect caused by individual block transform. More specifically, overlap filter is firstly performed on 4×4 blocks at the 4×4 block juncture, and then core transform is performed on the 4×4 blocks. The overlap filter and core transform both employ a lifting structure to ensure possibility of lossless compression.

FIG. 2 shows US Patent Application Publication No. 2006/013682 entitled "Reversible Overlap Operator for Efficient Lossless Data Compression," which describes the HD Photo format introduced by Microsoft. For example, firstly, perform tiling on 2-dimensional (2-D) input data as shown in the figure, and perform lapped transform, such as filter transform of forward overlap shown in the figure, so as to reduce the block effect caused by the individual block transform. Then, perform block transform, i.e., HD Photo Core Transform (PCT), on originally tiled blocks, thereby obtaining a DC coefficient and fifteen AC coefficients. The HD Photo format adopts two-stage transform to collect the DC values again to form a block and perform the overlap filter transform and block transform again.

The aforementioned overlap filter transform and core transform both adopt a lifting structure to ensure the possibility of lossless compression. Since each step of the lifting structure is absolutely reversible, if an encoding process adopts a signal in a lossless compression transform field, a picture exactly like an original picture may be recovered by firstly performing reverse core transform in a decoding process and then performing reverse overlap filter transform. The RD Photo format may select whether to perform the first stage of overlap filter transform and the second stage of overlap filter transform. After the DC coefficient and AC coefficients undergo the processes of the quantization, entropy coding, and packetization, a compressed bitstream is obtained.

FIG. 3A is a schematic view of the overlap filter transform according to the HD Photo format. An image is firstly tiled into 4×4 blocks based on the lapped transform in a unit of 4×4 block used by the individual block, as shown by solid lines 310. Then, the overlap filter transform is performed on the junctures of the 4×4 blocks, for example, the 4×1 filter transform (4×1 filter 330 in FIG. 3A) is performed at the boundaries of the image, and the 4×4 filter transform, e.g., 4×4 filter 320, is performed inside the image.

Next, as shown in FIG. 3B, after the overlap filter transform, the core transform is further performed on the originally tiled 4×4 blocks (4×4 PCT as shown in FIG. 3B), and each 4×4 block may derive one DC value and fifteen AC values. The HD Photo adopts the two-stage transform to collect the DC values again to form 4×4 blocks and perform the overlap filter again. The HD Photo format may select whether to perform the first stage of overlap filter transform and the second stage of overlap filter transform.

Comparing with the conventional DCT, the lifting lapped transform need read/write data for many times in a more complicated manner. In order to solve this problem, Taiwan Patent Application No. 95128032 (corresponding to US Patent Publication No. 2007/0036225A1) has disclosed a method of re-arranging signals for the convenience of single-instruction multiple-data (SIMD) processor operation. As shown in FIGS. 3A and 3B, the different blocks after the 4×4 overlap filter and 4×4 core transform will overlap with 2×2 blocks. However, the method is more suitable for realizing a processor adopting the SIMD operation.

In the aforementioned conventional architecture, the core transform cannot be performed unless the overlap filter has been finished. As shown in FIGS. 3A and 3B, after the 4×4 and 4×1 overlap filter transform, the core transform is performed on the originally tiled 4×4 blocks. There is a need to improve the processing time and efficiency.

SUMMARY OF THE INVENTION

The present invention provides an apparatus for performing overlap filter and core transform. The apparatus includes a first select multiplexer, a transform operation module array, a second select multiplexer, a register array, and a control signal generator. The first select multiplexer is used to receive multi-port input data. The transform operation module array is connected to the first select multiplexer, and receives multi-port output of the first select multiplexer. The second select multiplexer is connected to the transform operation module array, and receives output of multi-port operation results of the transform operation module array and the multi-port input data. The register array including a plurality of registers is connected to the second select multiplexer, so as to receive multi-port output of the second select multiplexer, and temporarily store the received data in a part of the registers. The first select multiplexer and the second select multiplexer are both used to read stored values in the registers in the register array. The control signal generator generates a plurality of control signals according to a schedule of the overlap filter and the core transform, so as to control the first select multiplexer, the transform operation module array, the second select multiplexer, and the register array. The control signal generator controls the first select multiplexer to select the multi-port input data and the stored values in a part of the registers in the register array. A part of the data is input into the transform operation module array. In addition, the control signal generator controls the second select multiplexer to select the multi-port input data, the multi-port operation results output by the transform operation module array, and the stored values in a part of the registers in the register array, and output them to the register array to be temporarily stored.

The present invention provides an operation method of performing the overlap filter and core transform, which is suitable for a multi-port data processing apparatus. The multi-port data processing apparatus includes a transform operation module array for receiving and operating the multi-port input data to be temporarily stored in the register array. The method includes generating a plurality of control signals according to a schedule of the overlap filter and the core transform; selecting a part of the multi-port input data and a part of stored values in the register array according to the control signals, and outputting them into a transform operation module for operation; selecting a part of the multi-port input data, multi-port operation results of the transform operation module array, and a part of stored values in the register array according to the control signals, and output them to the register array to be stored; and outputting a part of the multi-port operation results output by the transform operation module array in a multi-port manner according to the schedule of the overlap filter and the core transform.

In order to make the aforementioned and other objectives, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3B shows that the core transform (4×4 PCT as shown in this figure) is performed on the originally tiled 4×4 blocks after the overlap filter transform.

FIGS. 8 and 9 show embodiments of illustrating operation contents of functions of the overlap filter and core transform.

FIG. 10 is a schematic view of operation contents of T_h in the overlap filter.

FIGS. 11A-11D are schematic views of the detailed schedule of the 4×4 overlap filter and 4×4 core transform.

DESCRIPTION OF THE EMBODIMENTS

Figure 1:
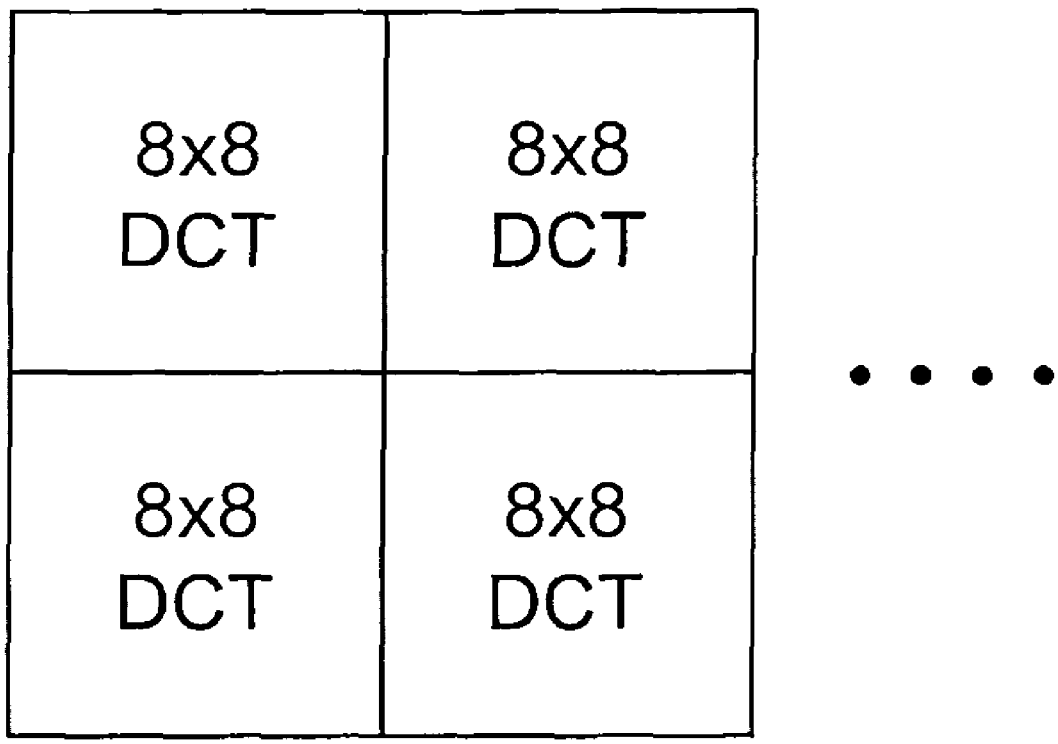
FIG. 1 shows Discrete Cosine Transform (DCT) in an individual transform unit of 8×8 block.
Figure 2:
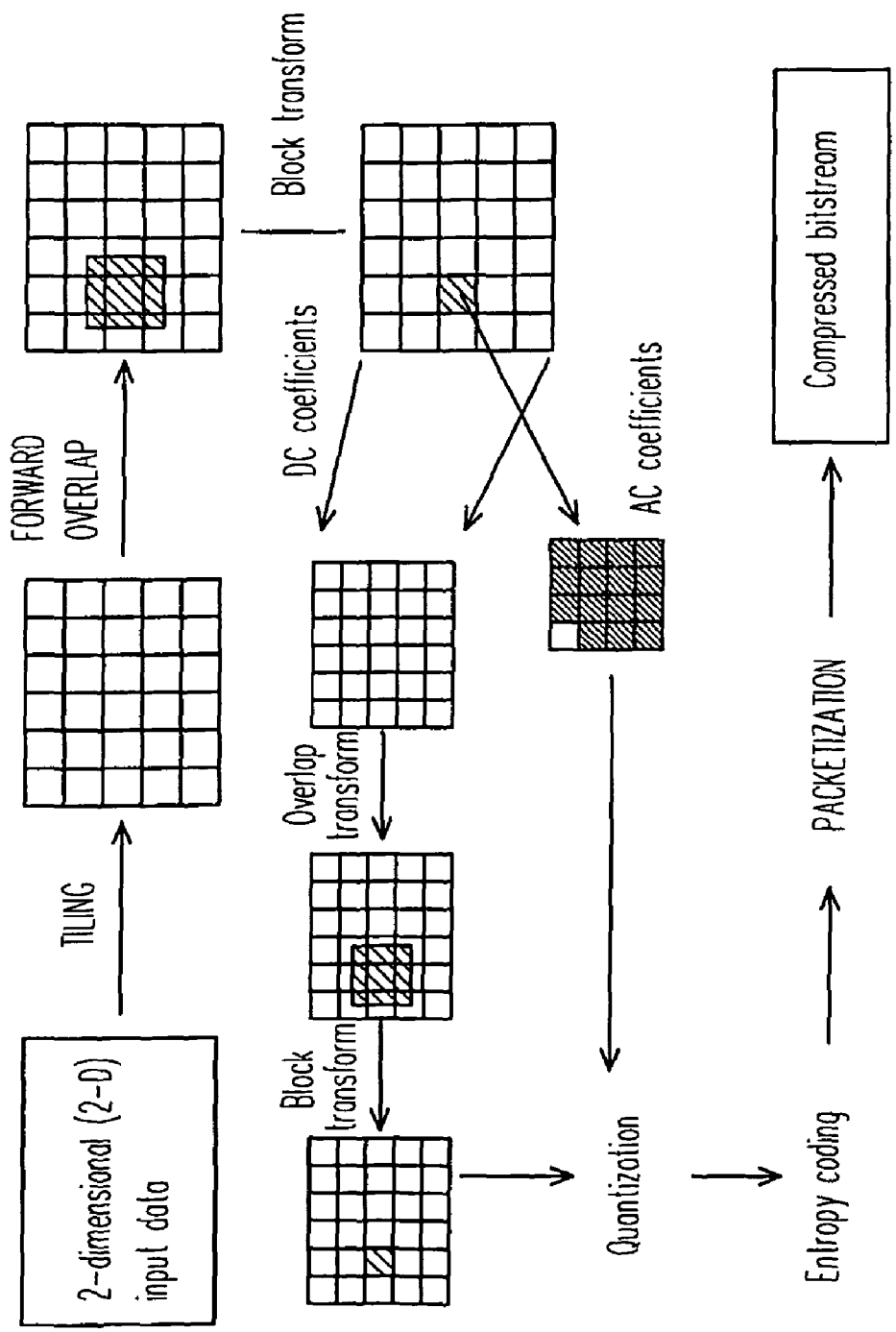
FIG. 2 is a schematic view of performing the overlap filter transform and the core transform on 2-dimensional input data in a lifting structure.
Figure 3A:
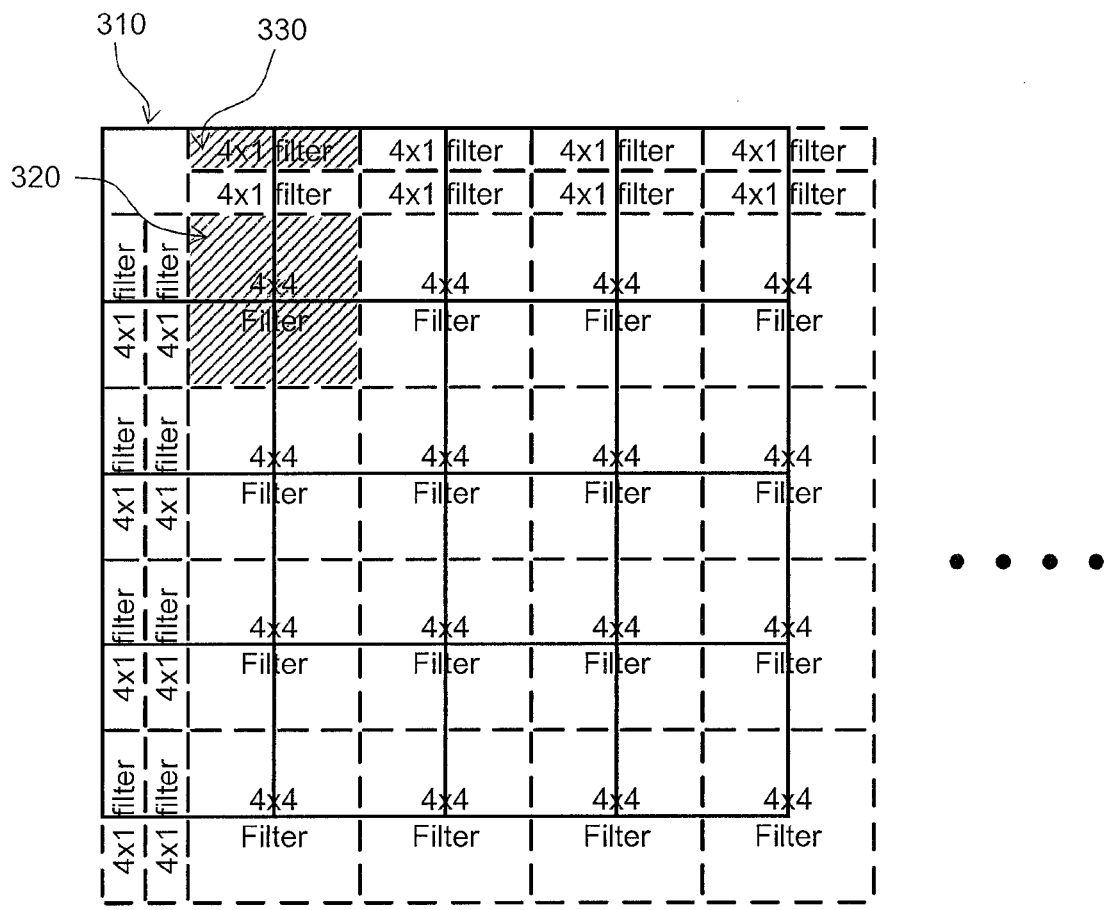
FIG. 3A is a schematic view of the overlap filter transform according to the HD Photo format.

Reference will now be made in detail to the present embodiments of the invention, examples of which are illustrated in the accompanying drawings. Wherever possible, the same reference numbers are used in the drawings and the description to refer to the same or like parts.

The present invention provides a hardware implementation for concurrently performing overlap filter and core transform and an operation method thereof. The overlap filter and core transform can be adjusted according to different specifications, processes, and operation frequencies. The prevent invention adopts a transform-level hardware sharing architecture, and multi-port input/output register array, thereby efficiently realizing overlap filter and core transform.

The present invention provides a hardware architecture for efficiently performing a lifting lapped transform and a lifting core transform. In one embodiment, the lifting lapped transform and core transform may be implemented according to a hardware architecture shown in FIG. 4. The hardware architecture 400 is a hardware device capable of performing the overlap filter and core transform concurrently, and includes a data input end 402 having multi-port input, select multiplexers (MUX) 410 and 430, a transform operation module array 420 having multi-port data input/output, a register array 440 having multi-port data input/output, a data output end 404 having multi-port output, and a control signal generator 450. The transform operation module array 420 includes operation necessary for the lapped transform, and may fully use the identical or similar operations of the overlap filter and the core transform repeatedly. The register array 440 provides a very flexible function of reading and writing temporarily stored data, so as to finish the whole complicated lapped transform.

The transform operation module array 420 which may fully use the identical or similar operations of the overlap filter and the core transform repeatedly may be used to finish all operations regarding the lapped transform in the HD Photo format, including overlap filter operation, overlap filter operation at boundaries, core transform, core transform for DC coefficients, and all corresponding reverse transform operations. The aforementioned operations all meet the HD Photo format, that is to say, the overlap filter operation and the core transform operation necessary for a JPEG-XR format are currently realized by hardware. Corresponding variations may be made according to different specifications, processes, and operation frequencies.

Figure 5:
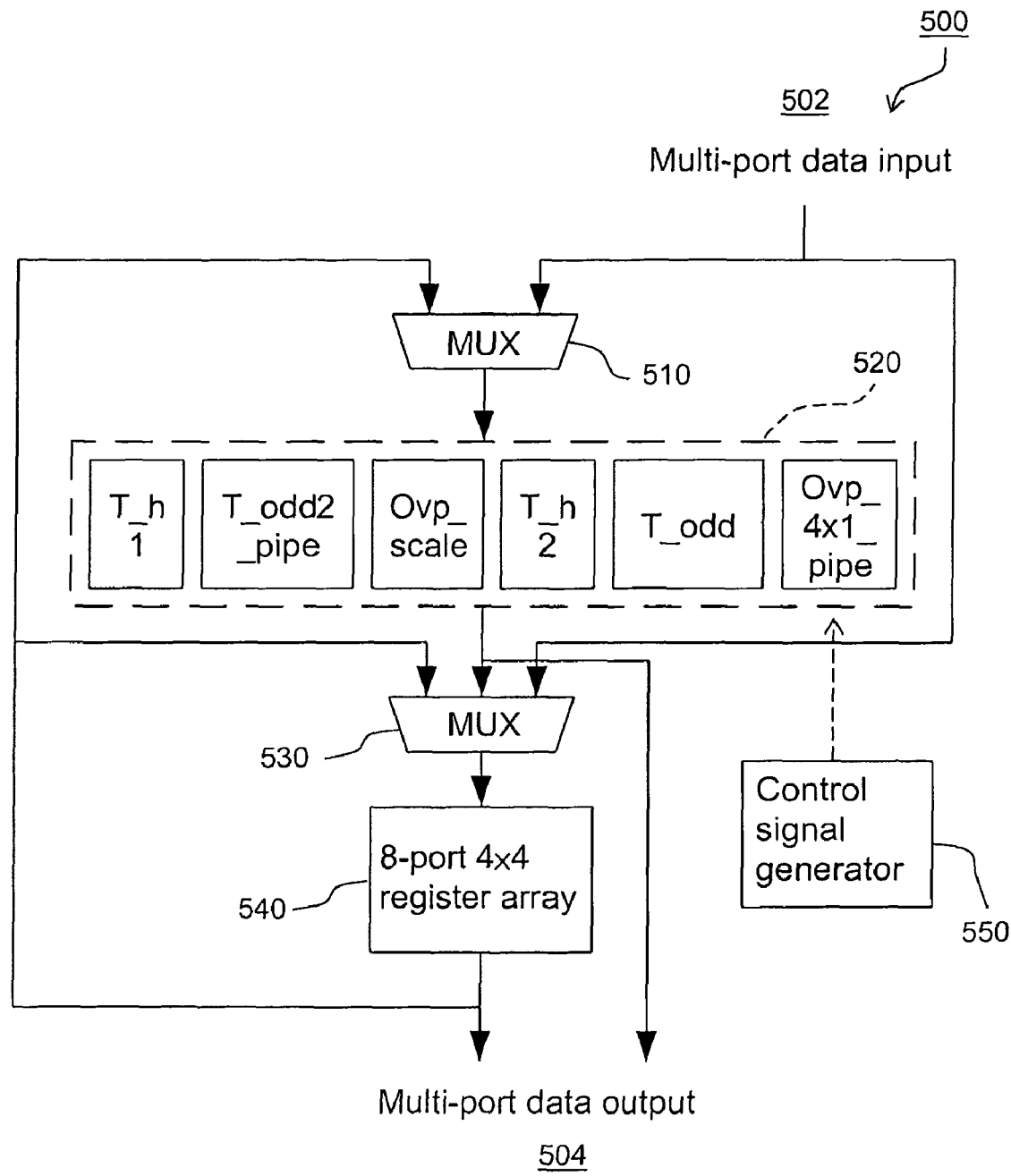
FIG. 5 is a schematic view of a circuit structure of the transform operation module array according to an embodiment of the present invention.

In an embodiment, FIG. 5 is a schematic view of a circuit structure of an embodiment of the transform operation module array. The circuit structure 500 includes not only a data input end 502 having multi-port input, select multiplexers (MUX) 510 and 530, an 8-port 4×4 register array 540, a data output end 504 having multi-port output, and a control signal generator 550, but also a transform operation module array 520 having multi-port data input/output. The transform operation module array 520 includes a plurality of operation units, for example, sub-function operation units of sub-functions T_h1, T_odd2_pipe, Ovp_scale, T_h2, T_odd, and Ovp_4×1_pipe. The sub-function operation units represent a series of operations on four or two input signals. For example, 4×4 overlap filter operation and 4×4 core transform operation have a lot of similar but not identical operations. Therefore, the identical or similar operation of the overlap filter and the core transform may be used repeatedly according to a data processing sequence, thereby saving cost of operation units.

Figures 6, 7:
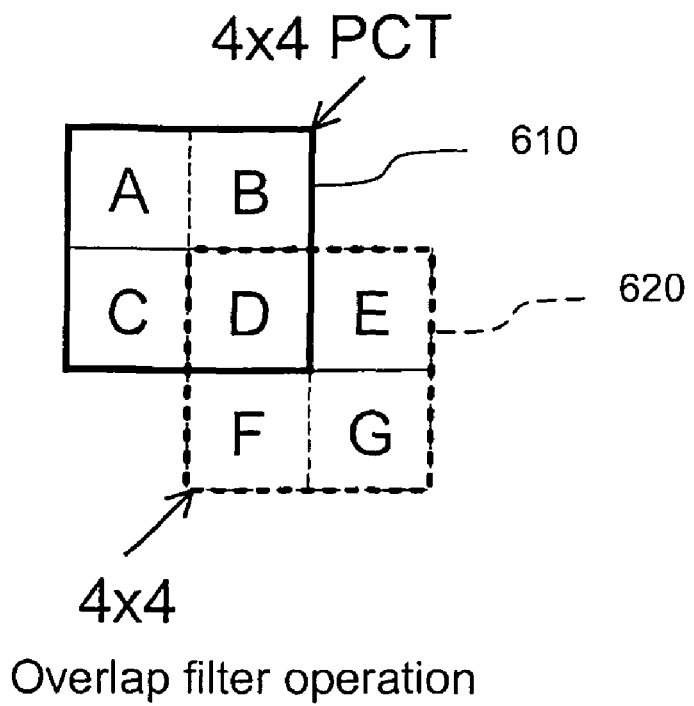
FIG. 6 is a schematic view of data of 4×4 overlap filter operation and 4×4 core transform operation.
FIG. 7 shows input data performing 4×4 overlap filter and 4×4 core transform.

FIG. 6 is a schematic view of data of the 4×4 overlap filter operation and the 4×4 core transform operation, including the overlap filter operation of a dashed line region 620 of data D, E, F, and G, and the core transform operation of a solid line region 610 of data A, B, C, and D. The circuit structure 500 in FIG. 5 may be used to perform the overlap filter operation and core transform operation in FIG. 6, so as to finish them in seventeen operation cycles.

Inputs of the 4×4 overlap filter and 4×4 core transform are both 4×4 signals in FIG. 7, including data such as "a, b, c, d, e, f, g, h, i, j, k, l, m, n, o, p." The detailed function operations are shown in FIGS. 8 and 9 respectively. Each of the sub-functions such as T_h, T_h_pre, Ovp_rotate, and Ovp_scale represents a series of operations on the four or two pieces of data among the aforementioned input data. For example, T_h_pre (a, d, m, p, 0) performs operation on four pieces of data "a, d, m, p", and Ovp_scale (a, p) performs operation on two pieces of data "a, p." The detailed operation contents of the aforementioned operation sub-functions may be referred to in the contents of operation sub-functions disclosed in US Patent Application Publication No. 2006/013683 entitled "Reversible Transform for lossy and lossless 2-D Data Compression," or different operation sub-function contents disclosed in US Patent Application Publication No. 2006/013684 entitled "Reversible 2-Dimensional Pre-/Post-Filtering For Lapped Biorthogonal Transform."

Figure 4:
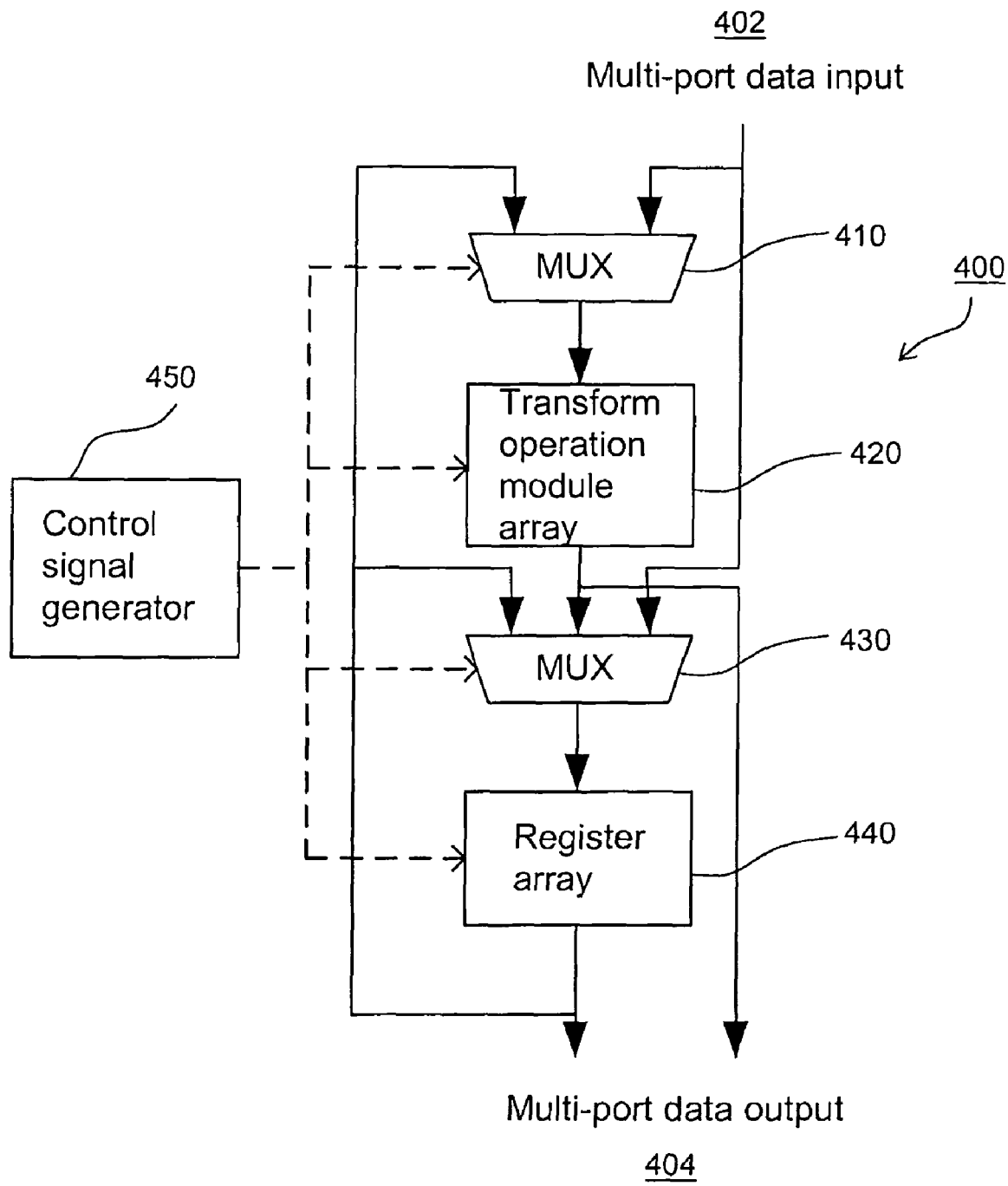
FIG. 4 is a schematic view of the hardware architecture for concurrently performing overlap filter transform and core transform efficiently according to an embodiment of the present invention.

The aforementioned operations all meet the HD Photo format, i.e., the overlap filter operation and the core transform operation necessary for the JPEG-XR format. For example, the operation of T_h is shown in FIG. 10, and 4×4 overlap filter and 4×4 core transform have some quite similar but not identical operations, such as T_h and T_h_pre, and T_odd2 and T_odd2_pre.

According to the circuit structure 500 in FIG. 5 of an embodiment of the present invention, the operations on an input signal in FIG. 6 is described.

An operation unit T_h1 and an operation unit T_h2 in FIG. 5 finish the operations necessary for T_h and T_h_pre in one cycle, an operation unit T_odd2_pipe finishes the operations necessary for T_odd2 or T_odd2_pre in two cycles, an operation unit Ovp_scale finishes the operation necessary for Ovp_scale in one cycle, an operation unit T_odd finishes the operation necessary for T_odd in one cycle, and an operation unit Ovp_4×1_pipe finishes 4×1 overlap filter at boundaries in four cycles or the operation necessary for Ovp_rotate in one cycle. As described above, a schedule of 4×4 overlap filter and 4×4 core transform shown in FIG. 6 is finished in seventeen cycles. Since there are eight input/output ports, to transmit data, up to eight signals are input in one cycle, two operation units perform operation concurrently, eight signals are temporarily stored in one cycle, eight signals are output in one cycle, and other lapped transform and reverse lapped transform operations may also be finished with the same schedule concept.

The detailed schedule of finishing the 4×4 overlap filter and 4×4 core transform in seventeen cycles (i.e., the $0_{th}$-$16_{th}$ cycles) is described in detail below, and FIGS. 11A-FIG. 11D are referred to correspondingly.

Firstly, referring to FIG. 11A, in the $0_{th}$ cycle, for example, data a, d, m, p, b, c, n, and o necessary for the 4×4 overlap filter operation in FIG. 8 is input at the input end. The transform operation module array 520 having multi-port data input/output in the circuit structure 500 of FIG. 5 finishes the operation necessary for T_h or T_h_pre with the operation unit T_h1 or the operation unit T_h2 in this cycle. For example, the operation unit T_h1 performs the operation of T_h_pre (a, d, m, p, 0), and the operation unit T_h2 performs the operation of T_h_pre (b, c, n, o, 0). At this time, operation results of the operation unit T_h1 are stored in registers 0, 3, 12, and 15 in the register array, and operation results of the operation unit T_h2 are stored in registers 1, 2, 13, and 14 in the register array. At present, the multi-port output at the output end has no results.

In the first cycle, data e, h, i, l, f, g, j, and k is input at the input end, and the transform operation module array 520 performs operation of T_h_pre (e, h, i, l, 0) with the operation unit T_h1, and performs operation of T_h_p re (f, g, j, k, 0) with the operation unit T_h2. At this time, operation results of the operation unit T_h1 are stored in registers 5, 6, 9, and 10 in the register array, and operation results of the operation unit T_h2 are stored in registers 4, 7, 8, and 11 in the register array. At present, the multi-port output at the output end has no results.

In the second cycle, no data needs to be input. The operation unit Ovp_scale of the transform operation module array 520 performs the operation of Ovp_Scale (R[0], R[15]), and the operation unit Ovp_4×1_pipe performs the operation of Ovp_Rotate (R[13], R[12]). R[0], R[15], R[13], and R[12] are the values in the registers in the register array. At this time, operation results of the operation unit Ovp_scale are stored in registers 0 and 15 in the register array, and operation results of the operation unit Ovp_4×1_pipe are stored in the registers 13 and 12. At present, the multi-port output at the output end has no results.

In the third cycle, no data needs to be input. The operation unit Ovp_scale of the transform operation module array 520 performs the operation of Ovp_Scale (R[5], R[10]), and the operation unit Ovp_4×1_pipe performs the operation of Ovp_Rotate (R[9], R[8]). At this point, operation results of the operation unit Ovp_scale are stored in the registers 5 and 10 in the register array, and operation results of the operation unit Ovp_4×1_pipe are stored in registers 9 and 8. At present, the multi-port output at the output end has no results.

In the fourth cycle, no data needs to be input. The operation unit Ovp_scale of the transform operation module array 520 performs the operation of Ovp_Scale (R[1], R[14]), and the operation unit Ovp_4×1_pipe performs the operation of Ovp_Rotate (R[7], R[3]). At this point, operation results of the operation unit Ovp_scale are stored in registers 1 and 14 in the register array, and operation results of the operation unit Ovp_4×1_pipe are stored in registers 7 and 3. At present, the multi-port output at the output end has no results.

Referring to FIG. 11B, in the fifth cycle, no data needs to be input. The operation unit Ovp_scale of the transform operation module array 520 performs the operation of Ovp_Scale (R[4], R[11]), and the operation unit Ovp_4×1_pipe performs the operation of Ovp_Rotate (R[6], R[2]). At this point, operation results of the operation unit Ovp_scale are stored in registers 4 and 11 in the register array, and operation results of the operation unit Ovp_4×1_pipe are stored in registers 6 and 2. At present, the multi-port output at the output end has no results.

In the sixth and seventh cycles, no data needs to be input. The operation unit T_odd2_pipe finishes the operation necessary for T_odd2 in two cycles. For example, in the sixth cycle, the first cycle of operation is performed on T_odd2 (R[10], R[11], R[14], R[15]), and results are stored in registers 10, 11, 14, and 15. In the seventh cycle, the second cycle of operation is performed on T_odd2 (R[10], R[11], R[14], R[15]), and results are stored on registers 10, 11, 14, and 15. At present, the multi-port output at the output end has no results.

Then, in the eighth cycle, no data needs to be input. The operation unit T_h1 performs the operation of T_h (R[0], R[3], R[12], R[15], 0), and the operation unit T_h2 performs the operation of T_h (R[1], R[2], R[13], R[14],0). At this point, operation results of the operation unit T_h1 are stored in registers 0, 3, 12, and 15 in the register array, and operations results of the operation unit T_h2 are stored in registers 1, 2, 13, and 14 in the register array. At present, the multi-port output at the output end has no results.

Referring to FIG. 11C, in the ninth cycle, no data needs to be input. The operation unit T_h1 performs the operation of T_h (R[5], R[6], R[9], R[10], 0), and the operation unit T_h2 performs the operation of T_h (R[4], R[7], R[8], R[11], 0). At this point, operation results of the operation unit T_h1 are stored in registers 5, 6, 9, and 10 in the register array, and operation results of the operation unit T_h2 are stored in registers 4, 7, 8, and 11 in the register array. At present, the multi-port output at the output end has no results.

In the tenth cycle, the input end inputs eight signals of sections B and C necessary for the 4×4 PCT core transform in FIG. 6. At this time, the operations of the operation units are not required. In the register array, the four signals of the section B are temporarily stored in registers 2, 3, 6, and 7, and the four signals of the section C are temporarily stored in registers 8, 9, 12, and 13. At this point, the output end outputs R[2], R[3], R[6], and R[7] concurrently to the outside where a section E in FIG. 6 is temporarily stored, and outputs R[8], R[9], R[12], and R[13] to the outside where a section F in FIG. 6 is temporarily stored.

Then, in the eleventh cycle, the input end inputs four signals of a section A necessary for the 4×4 PCT core transform in FIG. 6. At this time, the operations of the operation units are not required. In the register array, the four signals of the section A are temporarily stored in registers 0, 1, 4, and 5, and original R[0], R[1], R[4], and R[5] are stored in registers 10, 11, 14, and 15. At this time, the output end outputs R[10], R[11], R[14], and R[15] to the outside where a section G in FIG. 6 is temporarily stored.

Then, in the twelfth cycle, no data needs to be input. The operation unit T_h1 performs the operation of T_h (R[0], R[3], R[12], R[15], 0), and the operation unit T_h2 performs the operation of T_h (R[1], R[2], R[13], R[14],0). At this point, operation results of the operation unit T_h1 are stored in registers 0, 3, 12, and 15 in the register array, and operation results of the operation unit T_h2 are stored in registers 1, 2, 13, and 14 in the register array. At present, the multi-port output at the output end has no results.

Referring to FIG. 11D, in the thirteenth cycle, no data needs to be input. The operation unit T_h1 performs the operation of T_h (R[5], R[6], R[9], R[10], 0), and the operation unit T_h2 performs the operation of T_h (R[4], R[7], R[8], R[11], 0). At this point, operation results of the operation unit T_h1 are stored in registers 5, 6, 9, and 10 in the register array, and operation results of the operation unit T_h2 are stored in registers 4, 7, 8, and 11 in the register array. At present, the multi-port output at the output end has no results.

In the fourteenth cycle, no data needs to be input. The operation unit T_h1 performs the operation of T_h (R[0], R[1], R[4], R[5], 1), and the operation unit T_odd performs the operation of T_odd (R[2], R[3], R[6], R[7]). At this point, the register array has no operation, and the output end outputs the results of T_h1 and T_odd (PCT operation results) to a subsequent processing unit.

Next, in the fifteenth and sixteenth cycles, no data needs to be input. The operation unit T_odd2_pipe finishes the operation necessary for T_odd2 in two cycles. For example, in the fifteenth cycle, the first cycle of operation is performed on T_odd2 (R[10], R[11], R[14], R[15]), and results are stored in registers 10, 11, 14, and 15. In the sixteenth cycle, the operation unit T_odd2_pipe performs the second cycle of operation of T_odd2 (R[10], R[11], R[14], R[15]), and at the same time, the operation unit T_odd performs the operation of T_odd (R[8], R[12], R[9], R[13]). Then, the output end outputs operation results of the operation unit T_odd2_pipe and operation unit T_odd (PCT operation results) and transmits the operation results to the subsequent processing unit.

It has been indicated in detail that, in the circuit structure 500 in FIG. 5, the function operation units T_h1, T_odd2_pipe, Ovp_scale, T_h2, T_odd, and Ovp_4×1_pipe of the transform operation module array 520 having multi-port data input/output finish the detail schedule of the 4×4 overlap filter and 4×4 core transform in seventeen cycles. The embodiment sufficiently indicates the hardware implementation for concurrently performing the overlap filter and core transform, and the overlap filter and core transform can be adjusted according to different specifications, processes, and operation frequencies. The present invention adopts a transform-level hardware sharing architecture, and multi-port input/output register array, thereby efficiently realizing the overlap filter and core transform.

Regarding the overlap filter operation of the dashed line region 620 of data D, E, F, and G and the core transform operation of the solid line region 610 of data A, B, C, D in FIG. 6, if the convention architecture is adopted, the core transform cannot be performed unless the overlap filter is finished. However, if the circuit structure 500 in FIG. 5 is adopted to perform the overlap filter operation and the core transform operation in FIG. 6, the overlap filter operation of the data D and the core transform operation of the data A, B, and C are finished firstly, and then the core transform operation of the data D is performed. Therefore, the operation is finished in seventeen cycles. That is to say, the hardware implementation for concurrently performing the overlap filter and the core transform is achieved through adjusting the data processing schedule of multiple function operation units in the transform operation module array 520 by using the multi-port input/output register array and data transmission of multi-port input/output ends.

The circuit structure in the embodiment includes a plurality of operation units, so as to finish the overlap filter transform operation necessary for encoding or reverse lapped transform operation necessary for decoding in the HD Photo format. The first select multiplexer, the transform operation module array, the second select multiplexer, and the register array have at least four data output or input ports.

When being used in encoding in the HD Photo format, the multi-port input data is original image data to be compressed, or DC coefficients of a first stage of core transform, or is signals that have undergone overlap filter transform but not accepted core transform yet.

When being used in decoding in the HD Photo format, the multi-port input data is signals to undergo a first stage or a second stage of reverse lapped transform, or signals that have undergone reverse core transform but not accepted reverse overlap filter transform yet.

Figure 12:
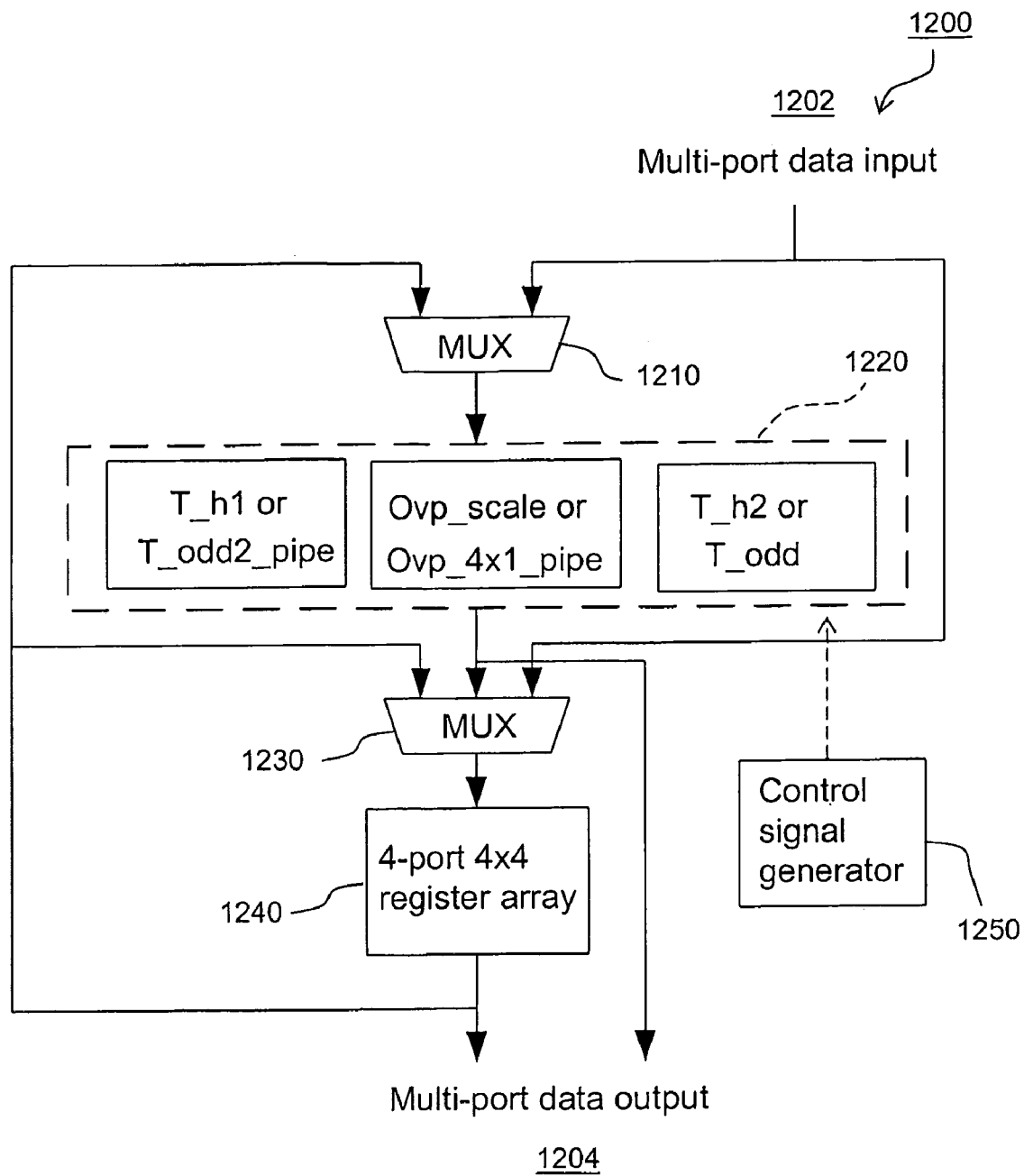
FIG. 12 is a schematic view of a circuit structure of the transform operation module array according to another embodiment of the present invention.

In another embodiment of the present invention, the operation units in FIG. 5 are combined in a such way that at most one operation unit performs the operation in one cycle, at most four signals are input in one cycle, at most four signals are temporarily stored in one cycle, and at most four signals are output in one cycle, thereby reducing hardware cost. However, the number of the operation cycles is increased. The specific embodiment is shown in FIG. 12 and described by referring to FIG. 5. As described above, the operation units T_h1 and T_odd2_pipe of the transform operation module array 520 having multi-port data input/output in FIG. 5 are combined, the operation units T_h2 and T_odd are combined, and the operation units Ovp_scale and Ovp_4×1_pipe are combined. Therefore, the circuit structure 1200 includes not only a data input end 1202 having multi-port input, select multiplexers (MUX)1210 and 1230, a data output end 1204 having multi-port output, and a control signal generator 1250, but also a 4-port 4×4 register array 1240, and a transform operation module array 1220 having multi-port data input/output. The transform operation module array 1220 merely includes three operation units, namely, an operation unit for processing the operations of T_h1 and T_odd2_pipe, an operation unit for processing the operations of Ovp_scale and Ovp_4×1_pipe, and an operation unit for processing the operations of T_h2 and T_odd.

The detailed schedule of the 4×4 overlap filter and 4×4 core transform finished in FIG. 11 may be directly changed to that at most four signals are input and output in one cycle, and at most one operation unit performs the operation in one cycle. For example, a, d, m, p are input in the $0_{th}$ cycle, T_h1 performs T_h_pre (a,d,m,p,0), and the results of T_h1 are temporarily stored in registers 0, 3, 12, and 15 in the register array; b, c, n, o are input in the first cycle, T_h2 performs T_h_pre (b, c, n, o,0), and results of T_h2 are temporarily stored in registers 1, 2, 13, and 14 in the register array. In a similar way, the whole schedule may be deduced.

Figure 13:
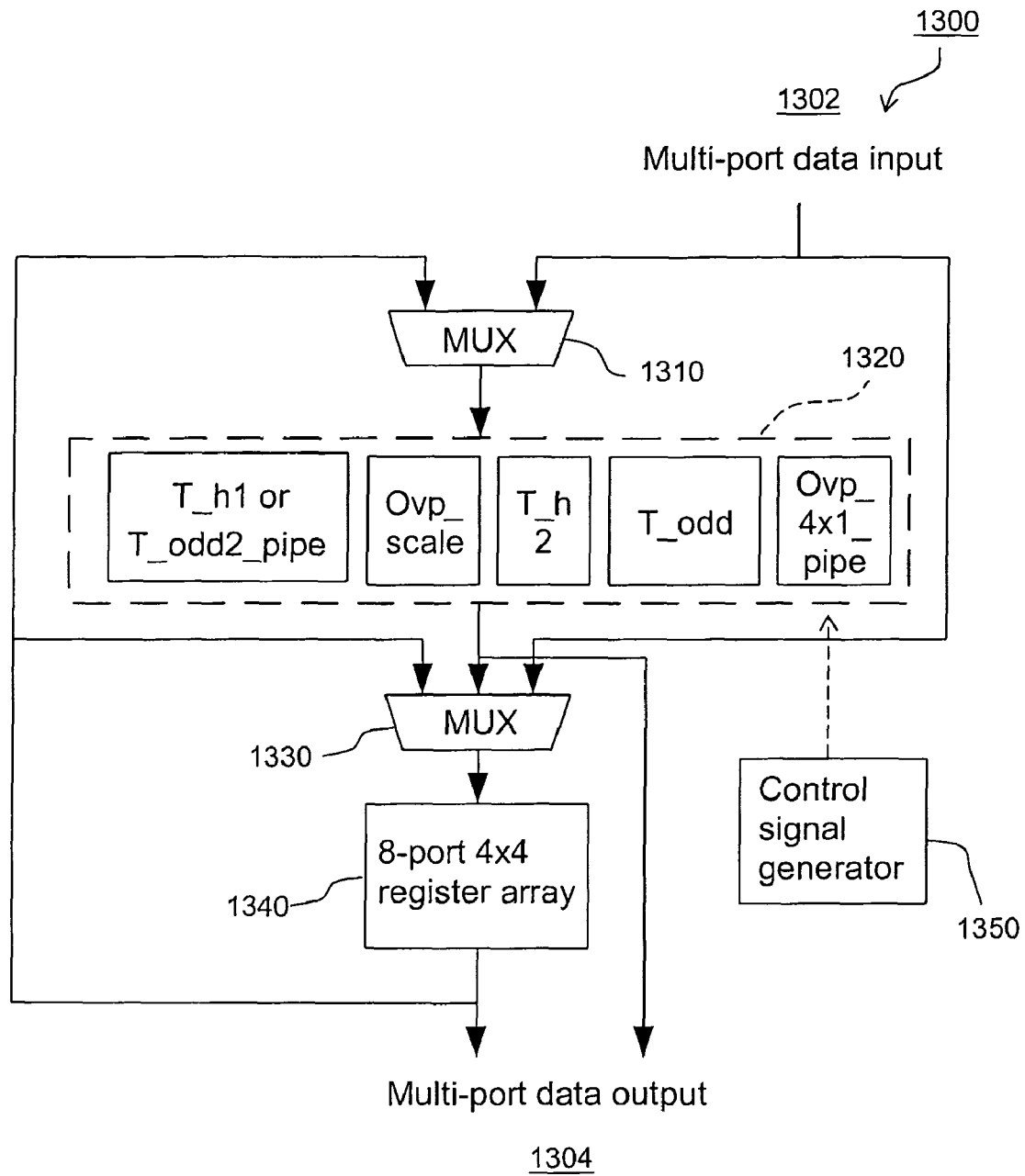
FIG. 13 is a schematic view of a circuit structure of the transform operation module array according to still another embodiment of the present invention.

In another embodiment of the present invention, some operation units in FIG. 5 are combined to share hardware, such as an adder or subtracter, thereby reducing the hardware cost. However, select multiplexers caused by sharing will increase the hardware cost as well as a critical path of the hardware. For example, in the schedule in FIG. 11, T_odd2_pipe and T_h1 in FIG. 5 do not act in the same cycle. Therefore, as shown in FIG. 13, the circuit structure 1300 includes not only a data input end 1302 having multi-port input, select multiplexers (MUX) 1310 and 1330, an 8-port 4×4 register array 1340, a data output end 1304 having multi-port output, and a control signal generator 1350, but also a transform operation module array 1320 having multi-port data input/output. The transform operation module array 1320 includes multiple operation units, for example, an operation unit for processing the operations of T_h1 or T_odd2_pipe, an operation unit for processing the operation of Ovp_scale, an operation unit for processing the operation of T_h2, an operation unit for processing the operation of T_odd, and an operation unit for processing the operation of Ovp_4×1_pipe.

The aforementioned circuit structure 1300 mainly combines the operation units T_h1 and T_odd2_pipe into one operation unit, which may also finish all operations using the schedule in FIG. 11. However, the combination need multiple select multiplexers inserted between original adders/subtracters of T_h1 and T_odd2_pipe, thereby elongating the critical path of the operation unit, as well as the time of one clock cycle.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for performing overlap filter and core transform, comprising:

a first select multiplexer, for receiving multi-port input data;

a transform operation module array, connected to the first select multiplexer, for receiving multi-port output of the first select multiplexer;

a second select multiplexer, connected to the transform operation module array, for receiving output of multi-port operation results of the transform operation module array and the multi-port input data;

a register array, comprising a plurality of registers, connected to the second select multiplexer, for receiving multi-port output of the second select multiplexer, and temporarily storing the received data in parts of the registers, wherein the first select multiplexer and the second select multiplexer are both used for reading values stored in the registers of the register array; and a control signal generator, generating a plurality of control signals according to a schedule of the overlap filter and the core transform, so as to control the first select multiplexer, the transform operation module array, the second select multiplexer, and the register array, wherein the control signal generator controls the first select multiplexer to select the multi-port input data and the values stored in the parts of the registers and to apply the selected data to the transform operation module array, wherein the control signal generator controls the second select multiplexer to select the multi-port input data, the multi-port operation results output by the transform operation module array, and the values stored in the parts of the registers, and to apply the selected data to the registers to be stored accordingly.

2. The apparatus for performing overlap filter and core transform according to claim 1, wherein the transform operation module array comprises a plurality of operation units for performing an overlap filter transform operation necessary for encoding and a reverse overlap filter transform operation necessary for decoding in an HD Photo format.

3. The apparatus for performing overlap filter and core transform according to claim 2, wherein each of the first select multiplexer, the transform operation module array, the second select multiplexer, and the register array has at least four data output or input ports.

4. The apparatus for performing overlap filter and core transform according to claim 2, wherein when being used in encoding in the HD Photo format, the multi-port input data is original image data to be compressed.

5. The apparatus for performing overlap filter and core transform according to claim 2, wherein when being used in encoding in the HD Photo format, the multi-port input data is DC coefficients of a first stage of the core transform, or is signals that have undergone the overlap filter transform but not performed by the core transform.

6. The apparatus for performing overlap filter and core transform according to claim 2, wherein when being used in decoding in the HD Photo format, the multi-port input data is signals to undergo a first stage or a second stage of the reverse lapped transform, or signals that have undergone reverse core transform but not performed by the reverse overlap filter transform.

7. The apparatus for performing overlap filter and core transform according to claim 1, wherein the transform operation module array comprises a plurality of operation units, when the schedule of the overlap filter and the core transform is performing encoding in the HD Photo format, a part of the operation units is used to perform overlap filter operation, and another part of the operation units is used to perform core transform operation.

8. The apparatus for performing overlap filter and core transform according to claim 7, wherein the operation units at least comprise a overlap filter operation unit, a overlap filter operation unit at boundaries, a core transform unit, and a core transform unit for DC coefficients.

9. The apparatus for performing overlap filter and core transform according to claim 1, wherein the transform operation module array comprises a plurality of operation units, when the schedule of the overlap filter and the core transform is performing decoding in the HD Photo format, a part of the operation units is used to perform reverse overlap filter operation and another part of the operation units is used to perform reverse core transform operation.

10. The apparatus for performing overlap filter and core transform according to claim 9, wherein the operation units at least comprise reverse a overlap filter operation unit, a reverse overlap filter operation unit at boundaries, a reverse core transform unit, and a reverse core transform unit for DC coefficients.

11. An operation method of performing overlap filter and core transform, suitable for a multi-port data processing apparatus, wherein the multi-port data processing apparatus comprises a transform operation module array comprising a plurality of operation units for receiving and calculating multi-port input data to be temporarily stored in a register array, the method comprising:
  generating a plurality of control signals according to a schedule of a overlap filter and core transform;
  selecting first data from the multi-port input data and stored values in the register array according to the control signals, and outputting the selected first data to the transform operation module for operation;
  selecting second data from the multi-port input data, multi-port operation results output by the transform operation module array, and the stored values in the register array according to the control signals, and outputting the selected second data to the register array to be stored; and
  outputting a part of the multi-port operation results output by the transform operation module array in a multi-port manner according to the schedule of the overlap filter and the core transform.

12. The method according to claim 11, wherein the operation units are configured for finishing overlap filter transform operation necessary for encoding and reverse overlap filter transform operation necessary for decoding in an HD Photo format.

13. The method according to claim 12, wherein when being used in encoding in the HD Photo format, the multi-port input data is original image data to be compressed.

14. The method according to claim 13, wherein when being used in encoding in the HD Photo format, the multi-port input data is DC coefficients of a first stage of core transform, or is signals that have undergone overlap filter transform but not performed by the core transform.

15. The method according to claim 12, wherein when being used in decoding in the HD Photo format, the multi-port input data is signals to undergo a first stage or a second stage of reverse lapped transform, or signals that have undergone reverse core performed but not by the reverse overlap filter transform.

16. The method according to claim 11, wherein the transform operation module array comprises a plurality of operation units, when the schedule of the overlap filter and the core transform is performing encoding in the HD Photo format, a part of the operation units is used to perform overlap filter operation, and another part of the operation units is used to perform core transform operation.

17. The method according to claim 16, wherein the operation units at least comprise an overlap filter operation unit, an overlap filter operation unit at boundaries, a core transform unit, and a core transform unit for DC coefficients.

18. The method according to claim 11, wherein the transform operation module array comprises a plurality of operation units, when the schedule of the overlap filter and the core transform is performing decoding in the HD Photo format, a part of the operation units is used to perform reverse overlap filter operation and a part of the operation units is used to perform reverse core transform operation.

19. The method according to claim 18, wherein the operation units at least comprise a reverse overlap filter operation unit, a reverse overlap filter operation unit at boundaries, a reverse core transform unit, and a reverse core transform unit for DC coefficients.

* * * * *